Figure 1:
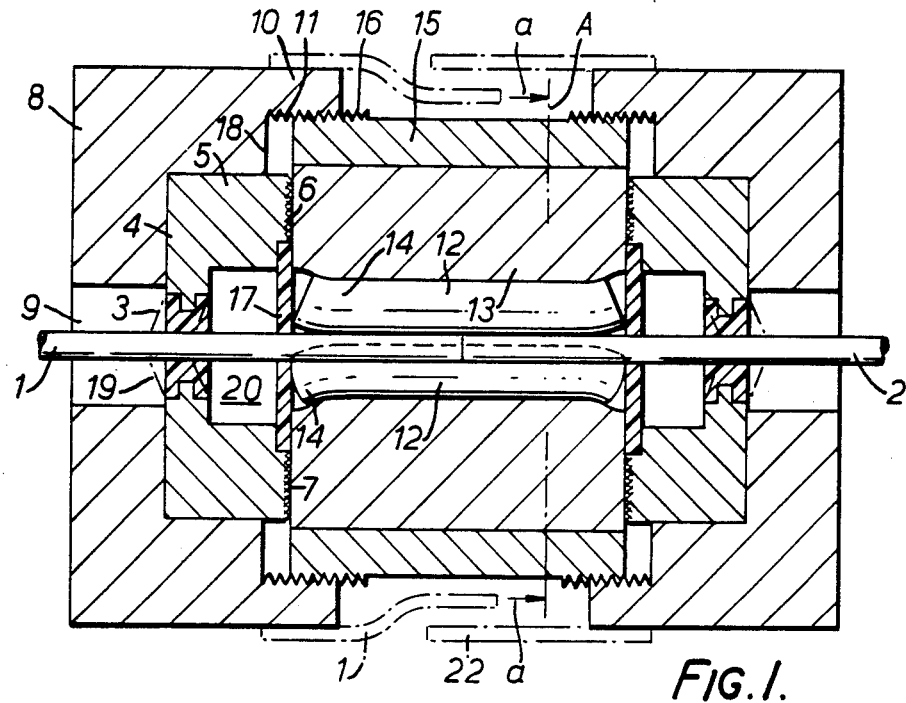

United States Patent
Stewart

[11] 4,061,416
[45] Dec. 6, 1977

[54] OPTICAL FIBRE CONNECTOR

[75] Inventor: William James Stewart, Towcester, England

[73] Assignee: Plessey Handel und Investments A.G., Zug, Switzerland

[21] Appl. No.: 629,570

[22] Filed: Nov. 6, 1975

[30] Foreign Application Priority Data

Nov. 8, 1974  United Kingdom ............... 48339/74

[51] Int. Cl.² ............................................. G02B 5/16
[52] U.S. Cl. ............................................. 350/96 C
[58] Field of Search ................................. 350/96 C

[56] References Cited

U.S. PATENT DOCUMENTS

| | | | |
|---|---|---|---|
| 3,535,017 | 10/1970 | Miller | 350/96 WG |
| 3,734,594 | 5/1973 | Trambarulo | 350/96 C |
| 3,846,010 | 11/1974 | Love | 350/96 C |

FOREIGN PATENT DOCUMENTS 1,267,788  3/1972  United Kingdom ............... 350/96 C

*Primary Examiner*—John K. Corbin
*Assistant Examiner*—Rolf Hille
*Attorney, Agent, or Firm*—Fleit & Jacobson

[57] ABSTRACT

In a disconnectable optical fibre butt connector, each of two fibres 1, 2 to be butted, is supported near an end by a bush 3 carried by a flanged carrier disc 4 in a seating of a flanged cap 8. An alignment unit comprises three alignment rods 12 located in a distortable elastic sleeve 13 which is enclosed in a rigid tube 15. To assemble the connector, the fibre ends 1, 2 are inserted between the alignment rods 12 from opposite extremities, and are pushed home till they butt each other. The caps 8 are then screwed onto opposite extremities of the tube 15, forcing the flanges 5 of the carrier discs 4 against the sleeve 13, which distorts, clamping the fibre ends 1,2 in alignment between the alignment rods 12. The alignment unit may form part of a pressure-tight bulkhead.

4 Claims, 2 Drawing Figures

OPTICAL FIBRE CONNECTOR

This invention relates to optical fibre connectors.

According to the invention there is provided an optical fibre butt connector, capable of establishing a disconnectable butt connection between two optical fibres of equal diameter which includes the following eight features:

a. in respect of each fibre:
  i. an elastic bush supporting the fibre near an end of the fibre;
  ii. a carrier disc carrying the bush and having a flange extending parallel to the fibre towards the said end of the fibre, the flange terminating in a pressure face which is parallel to the plane of the disc;
  iii. and a cap having a bore through which the fibre gains access to the bush, the cap affording a seating for the carrier disc and having an internally threaded flange extending towards the said end of the fibre:
b. and, common to both fibres, an alignment unit comprising:
  iv. three alignment rods each having a diameter greater than the diameter of the fibres;
  v. a sleeve of distortable elastic material enclosing the rods;
  vi. and a rigid tube enclosing the sleeve, the tube being externally threaded at each end to permit engagement with the flange of a cap:
c. whereby:
  vii. when the fibre ends are inserted between the alignment rods at opposite extremities of the rods, the rods are constrained in the sleeve in a mutually parallel relationship which places the fibre-ends in alignment with each other;
  viii. and, when the caps are screwed onto the ends of the tube, the sleeve is subjected to pressure at the pressure faces of the carrier flanges, the sleeve distorting under this pressure to exert on the alignment rods a clamping force which clamps the fibre ends in alignment with each other.

Figure 2:
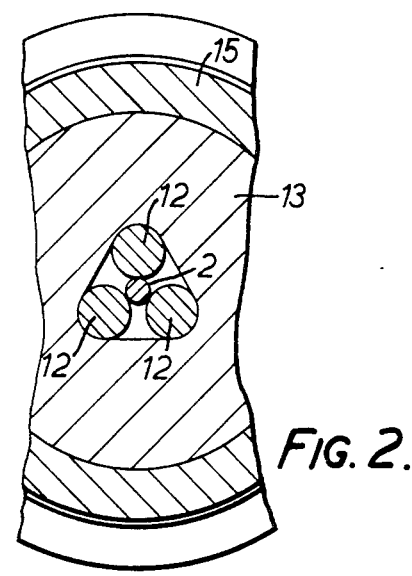

The invention will now be described with reference to the accompanying drawings in which:

FIG. 1 is a longitudinal section of a connector according to the invention just before assembly is completed, FIG. 2 is a partial cross section at the plane A of FIG. 1 looking in the direction of the arrows a.

The drawings are not to scale.

The need has arisen for a connector by which the ends of two optical fibres can be placed and held in alignment, which connector also permits the fibre ends to be separated and subsequently restored to their aligned relationship. Such connectors are useful when apparatus, which uses light transmitted by a fibre, is withdrawn from service for repair or replacement. Since the diameter of an optical fibre approximates to that of a human hair, the design of such a connector presents problems, particularly in connection with alignment of the fibre ends. These problems are resolved by the connector herein described.

In the following description the terms "optical fibre" and "fibre" are used. They are to be construed as including within their scope optical fibres which are enclosed in a protective sheath of steel or other material, and which are sometimes known as "composites" on account of their composite construction.

Referring to the drawings, two optical fibres 1, 2 have the same diameter. Their ends are to be held in alignment with each other. To achieve this a connector is provided.

The connector has, in respect of each fibre, a bush 3 of elastic material. (To avoid duplication, only the references appropriate the fibre 1 are shown in FIG. 1). The bush 3 has a central hole, through which the fibre 1 is threaded. The bush 3 supports the fibre 1 near one end of the fibre. The bush 3 is carried by a carrier disc 4 which has a flange 5 projecting towards the fibre end. The flange 5 terminates in a pressure face 6 which is parallel to the plane of the disc 4. The pressure face 6 is knurled as indicated by the hatching 7. The extent to which the flange 5 projects from the disc 4 will be considered later. A cap 8 has a bore 9, through which the fibre 1 gains access to the bush 3. The diameter of the bore 9 is large enough to accommodate distortion of the bush 3, as will be discussed later. The cap 8 affords a seating for the carrier disc 4, and has a flange 10 extending towards the end of the fibre 1. The flange 10 is internally threaded as shown at 11. These arrangements are duplicated in respect of the fibre 2. The connector also has an alignment unit which is common to both the fibres 1, 2. The alignment unit has three alignment rods 12. The diameter of each rod 12 is greater than the diameter of the fibres 1, 2, as will be considered later. The rods 12 are enclosed in a sleeve 13 in approximately parallel relationship, and are curved away from each other at their ends 14 to provide a lead-in for the fibres. The sleeve 13 is made of distortable elastic material such as rubber or a suitable plastics material. The sleeve 13 is enclosed in a rigid tube 15. At its ends, the tube 15 is externally threaded and dimensioned, as shown at 16, so as to engage the thread 11 on the inside of the flanges 10 of the caps 8. If desired, a membrane 17 may be provided, as will be considered later.

To assemble the connector, the fibre 1 is passed through the bore 9 of the cap 8 and is threaded through an approximately central hole in the bush 3. The fibre is positioned so as to project beyond the bush 3 to an extent such that the fibre end reaches approximately to the mid-point of the alignment unit. The second fibre 2 is treated similarly in respect of the other cap and bush of the connector.

The ends of the fibres 1, 2 are then inserted between the alignment rods 12 at opposite extremities of the rods. The insertion of the fibres forces the rods 12 into mutually parallel relationship. Each fibre has a single line of contact with each rod 12, and the fibre ends are aligned with each other. The fibre ends are then advanced until they butt against each other. This advance is followed up by screwing the caps 8 onto the tube 15. During the follow up, the caps 8 rotate freely on the flanges 5 of the carrier discs 4, bringing the pressure faces 66 of the discs 4 to bear on opposite ends of the sleeve 13. This is the position shown in FIG. 1. The screwing of the caps 8 is continued, increasing the pressure at the ends of the sleeve 13. The sleeve 13 is made of distortable elastic material, and the increasing end pressure tends to make the sleeve expand laterally. This tendency exerts on the rods 12 a force which urges the rods 12 towards each other, and which clamps the ends of the fibres 1, 2 in position. Excessive pressure is prevented by limiting the screwing action by means of a stop 18 formed in the cap 8 by a reduction in the internal diameter of the flange 10. During the increase of pressure at the pressure faces 6, the knurling 7 embeds itself in the material of the sleeve 3 and prevents the disc 4 from rotating with the cap 8 and imparting a twisting action to the fibre 1. During the screwing action which increases the pressure at the pressure face 6, the bush 3 distorts as shown at 19, because the fibre 1, being in butt contact with the fibre 2, cannot advance in sympathy with the cap 8. The bore 9 of the cap 8 is made large enough to accommodate the distortion of the bush 3. The flange 5 of the carrier disc 4 creates a chamber 20 between the bush 3 and the alignment unit. In designing the connector, the dimension of the chamber 20, in the direction of the fibre 1, is made great enough to accommodate any flexure of the fibre 1, which would occur if the fibre were threaded through a hole in the bush 3 which was not co-axial with the aligned fibre ends.

When the screwing action of the caps 8 has been completed, the ends of the fibres 1, 2 are clamped in abutting, aligned relationship. The connector is ready for use. The ends of the fibres 1, 2 may be separated at any time by unscrewing the caps 8, and withdrawing the fibre ends from contact with the alignment rods 12. After such withdrawal, the fibre ends project clear of the caps 8 and carrier discs 4, and may be deemed vulnerable. A measure of protection under these conditions may be obtained by providing shields 21, 22 in the form of circular walls supported externally on the flanges 10, the walls being staggered to allow of overlap when the connector is assembled. The fibre ends may be restored to their abutting, aligned relationship by repeating the process already described.

It will be appreciated that in the limiting position, the alignment rods 12 of the alignment unit will all lie in contact with each other. Into the space enclosed by the three rods, it will be possible to insert a fibre which makes contact with each of the three rods. The diameter of this fibre is determined by the diameter of the rods. Fibres of lesser diameter will not make contact with each of the three rods simultaneously, and cannot therefore be positioned by insertion between the rods. It would, therefore, be possible to provide a connector in which the alignment rods 12 are in contact with each other and determine the diameter of fibre which may be used. Such an arrangement, however, requires close control of the rod diameter during manufacture and accurate positioning of the rods relatively to each other. An alternative arrangement is to provide for the rods 12 to be only approximately parallel to each other when awaiting use, true parallelism being only established when, as already described, fibre ends are inserted at opposite extremities of the rods, and the rods 12 are separated from each other as shown in FIG. 2. This arrangement permits of simpler manufacture and easier use, though, for a given rod diameter, there is an increase in the minimum diameter of fibre that can be used.

The fibre diameter must not be so great that the fibre can separate any two alignment rods to such an extent that the fibre can pass between the rods. The fibre diameter must therefore not be greater than approximately 0.41 times the rod diameter.

In using the connector as so far described, difficulty may be experienced if irregularities are present at the fibre ends. This difficulty can be avoided if the alignment rods 12 are packed in a grease which has a refractive index compatible with that of the fibres. After the fibres have been inserted, the grease fills the irregularities at the fibre ends. The grease offers the additional advantage of acting as a lubricant when the fibre ends are inserted between the rods 12.

If grease is used, it is desirable also to provide retaining membranes 17, located between the sleeve 13 and the flanges 5 of the carrier discs 4. If the membranes are self-sealing, the grease will not suffer contamination by air when the fibre ends are withdrawn from contact with the rods 12. Self-sealing membranes would also allow a pressure differential to be sustained between opposite ends of the alignment unit. Under these conditions the alignment unit could be mounted in a pressure-tight bulkhead; one cap 8 would be screwed onto one end of the tube 15 at one side of the bulkhead, and the other cap 8 would be screwed onto the other end of the tube 15 at the other side of the bulkhead.

It is to be understood that the foregoing description of specific examples of this invention is made by way of example only and is not to be considered as a limitation in its scope.

What is claimed is:

1. An optical fibre butt connector capable of establishing a disconnectable butt connection between two optical fibres of equal diameter comprising for each fibre:
   i. an elastic bush means for supporting the fibre near an end of the fibre;
   ii. a carrier disc means for carrying the bush means comprising a carrier disc connected to said bush means and having a flange extending parallel to the fibre towards the said end of the fibre and substantially perpendicular to the plane defined by the carrier disc, the flange terminating in a pressure face which is parallel to the plane of the carrier disc;
   iii. and a cap having a bore means for receiving the fibre and through which the fibre gains access to the bush means, the cap including a seating means for receiving the carrier disc means and having an internally threaded flange extending towards the said end of the fibre, said butt connector further comprising an alignment unit, common to both fibres, comprising,
   iv. three alignment rods each having a diameter greater than the diameter of the fibres;
   v. a sleeve of distortable elastic material enclosing the rods;
   vi. and a rigid tube enclosing the sleeve, the tube being externally threaded at each end to permit engagement with said flange of said cap;
   vii. means for inserting each fibre end between the alignment rods at opposite extremities of the rods for constraining the rods in said sleeve in a mutually parallel relationship and for placing the fibre-ends in alignment with each other; and
   viii. means for clamping the fibre-ends comprising means for screwing the caps onto the ends of said tube, and for aligning the sleeve with the pressure faces of the carrier flanges, wherein the screwing of the caps onto the ends of the tube subjects the sleeve to pressure from the aligned pressure faces of the carrier flange and wherein the sleeve distorts under this pressure to exert on the alignment rods a clamping force which clamps the fibre ends in alignment with each other.

2. A connector as claimed in claim 1 wherein said pressure face is knurled, and wherein said flange of said carrier disc means is cylindrical and defines a chamber means for accommodating flexure of a fibre, and wherein the bore means of said cap includes means for accommodating distortion of said bush means.

3. A connector as claimed in claim 1 in which the alignment rods are packed in grease, and in which a retaining membrane is mounted between the sleeve of the alignment unit and the flange of said carrier disc means.

4. A connector as claimed in claim 1, wherein each said cap supports a shield means for shielding said fibre ends during assembly comprising a pair of circular walls, each of said circular walls affixed to one of said caps and extending toward the opposite cap, said circular walls being of different diameters so that they overlap each other when the connector is assembled.

* * * * *